(12) United States Patent
Shimshoni et al.

(10) Patent No.: US 11,354,938 B2
(45) Date of Patent: Jun. 7, 2022

(54) MOTION TRACKING WITH MULTIPLE 3D CAMERAS

(71) Applicant: CARMEL HAIFA UNIVERSITY ECONOMIC CORPORATION LTD., Haifa (IL)

(72) Inventors: Ilan Shimshoni, Haifa (IL); Hagit Hel-Or, Zichron Yacov (IL); Nadav Fredi Eichler, Haifa (IL); Shmuel Raz, Kfar Vradim (IL)

(73) Assignee: CARMEL HAIFA UNIVERSITY ECONOMIC CORPORATION LTD., Haifa (IL)

( * ) Notice: Subject to any disclaimer, the term of this patent is extended or adjusted under 35 U.S.C. 154(b) by 49 days.

(21) Appl. No.: 16/763,287

(22) PCT Filed: Nov. 13, 2018

(86) PCT No.: PCT/IL2018/051222
§ 371 (c)(1),
(2) Date: May 12, 2020

(87) PCT Pub. No.: WO2019/092730
PCT Pub. Date: May 16, 2019

(65) Prior Publication Data
US 2021/0056297 A1 Feb. 25, 2021

Related U.S. Application Data

(60) Provisional application No. 62/584,975, filed on Nov. 13, 2017.

(51) Int. Cl.
*G06K 9/00* (2022.01)
*G06T 7/80* (2017.01)
(Continued)

(52) U.S. Cl.
CPC ............... *G06V 40/23* (2022.01); *G06T 5/50* (2013.01); *G06T 7/285* (2017.01); *G06T 7/73* (2017.01);
(Continued)

(58) Field of Classification Search
CPC .......... G06K 9/00342; G06K 9/00214; G06K 9/4671; G06K 2209/055; G06K 9/00369;
(Continued)

(56) References Cited

U.S. PATENT DOCUMENTS

2012/0056982 A1   3/2012   Katz et al.

FOREIGN PATENT DOCUMENTS

WO   2010019925 A1   2/2010

OTHER PUBLICATIONS

Martinez-Zarzuela, M., Pedraza-Hueso, M., Diaz-Pernas, F.J., Gonzalez-Ortega, D. and Anton-Rodnguez, M., 2014. Indoor 3d video monitoring using multiple kinect depth-cameras. arXiv preprint arXiv:1403.2895.*

(Continued)

*Primary Examiner* — Zhitong Chen
(74) *Attorney, Agent, or Firm* — The Roy Gross Law Firm, LLC; Roy Gross

(57) ABSTRACT

A system comprising at least two three-dimensional (3D) cameras that are each configured to produce a digital image with a depth value for each pixel of the digital image; and a processor configured to: perform inter-camera calibration by: (i) estimating a pose of a subject, based, at least in part, on a skeleton representation of a subject captured each of by said at least two 3D cameras, wherein said skeleton representation identifies a plurality of skeletal joints of said subject, and (ii) enhancing the estimated pose based, at least in part, on a 3D point cloud of a scene containing the subject, as captured by each of said at least two 3D cameras, and (Continued)

perform data merging of digital images captured by said at least two 3D cameras, wherein the data merging is per each of said identifications.

15 Claims, 10 Drawing Sheets

(51) Int. Cl.

| | |
|---|---|
| *G06T 7/285* | (2017.01) |
| *G06T 7/73* | (2017.01) |
| *G06K 9/46* | (2006.01) |
| *G06T 5/50* | (2006.01) |
| *G06V 40/20* | (2022.01) |
| *G06V 10/46* | (2022.01) |
| *G06V 20/64* | (2022.01) |

(52) U.S. Cl.
CPC .............. *G06T 7/85* (2017.01); *G06V 10/462* (2022.01); *G06V 20/653* (2022.01); *G06T 2207/10012* (2013.01); *G06T 2207/10028* (2013.01); *G06V 2201/033* (2022.01)

(58) Field of Classification Search
CPC .. G06T 7/85; G06T 7/285; G06T 7/73; G06T 5/50; G06T 2207/10012; G06T 2207/10028; G06T 2207/30196; G06T 2210/56; G06T 17/00; H04N 5/232; H04N 5/247
See application file for complete search history.

(56) References Cited

OTHER PUBLICATIONS

Naveed Ahmed, United Skeleton Animation Reconstruction with Multiple Kinects. Eurographics 2014 Short paper.*

Ahmed, Unified Skeletal Animation Reconstruction with Multiple Kinects, Eurographics Short Papers); p. 5-8, 2014.

Besl et al., A method for registration of 3-D shapes. IEEE Transactions on Pattern Analysis and Machine Intelligence, 14(2), 239-256, 1992.

Choo et al., Statistical Analysis-Based Error Models for the Microsoft KinectTM Depth Sensor. Sensors, 14(9), 17430-17450, 2014.

Falie et al., Noise Characteristics of 3D Time-of-Flight Cameras. 2007 International Symposium on Signals, Circuits and Systems, 2007.

Fischler et al., Random sample consensus: a paradigm for model fitting with applications to image analysis and automated cartography. Communications of the ACM, 24(6), 381-395, 1981.

Galna et al., Accuracy of the Microsoft Kinect sensor for measuring movement in people with Parkinson's disease. Gait & Posture, 39(4), 1062-1068, 2014.

Kabsch, W. A solution for the best rotation to relate two sets of vectors. Acta Crystallographica Section A, 32(5), 922-923, 1976.

Kabsch, W. A discussion of the solution for the best rotation to relate two sets of vectors. Acta Crystallographica Section A, 34(5), 827-828, 1978.

Mallick et al., Characterizations of Noise in Kinect Depth Images: A Review. IEEE Sensors Journal, 14(6), 1731-1740, 2014.

Martinez-Zarzuela et al., Indoor 3D Video Monitoring Using Multiple Kinect Depth-Cameras, The International Journal of Multimedia & Its Applications (IJMA) vol. 6, No. 1, 2014.

Shotton et al., Real-time human pose recognition in parts from single depth images. Int. Conf. Computer Vision Patern recognition (CVPR), pp. 1297-1304, 2011.

Shotton et al., Real-time human pose recognition in parts from single depth images. Communications of the ACM, 56 (1), 116, 2013.

PCT Search Report for International Application No. PCT/IL2018/051222 dated Jan. 16, 2019, 3 pp.

PCT Written Opinion for International Application No. PCT/IL2018/051222 dated Jan. 16, 2019, 5 pp.

PCT Preliminary Report on Patentability for International Application No. PCT/IL2018/051222 dated May 19, 2020, 6 pp.

* cited by examiner

FIG. 4

MOTION TRACKING WITH MULTIPLE 3D CAMERAS

CROSS-REFERENCE TO RELATED APPLICATIONS

This application is a National Phase of PCT Patent Application No. PCT/IL2018/051222 having International filing date of Nov. 13, 2018, which claims the benefit of priority under 35 U.S.C. § 119(e) of U.S. Provisional Patent Application No. 62/584,975, filed Nov. 13, 2017, entitled "Motion Tracking with Multiple 3d Cameras." The contents of the above applications are all incorporated by reference as if fully set forth herein in their entirety.

BACKGROUND

The invention relates to the field of machine vision.

Three-dimensional (3D) cameras (also referred to as "depth cameras") are often used for capturing and tracking human motion for a variety of purposes, such as computer gaming, medical diagnosis, and rehabilitation assessment. Such 3D cameras provide a depth value per pixel indicating the distance of the scene point from the camera. The resulting depth map is often referred to as two-and-a-half-dimensional (2.5D) data.

Typically, 3D cameras create a representation of a tracked human in the form of a "body skeleton" (FIG. 1), which is calculated from the depth map captured by the camera's sensors. Several high-end motion capture systems are available, such as VICON (http://www.vicon.com.), Optotrak (https://www.ndigital.com/msci/products/optotrak-certus/), and Ipi soft (http://www.ipisoft.com), to name a few, which provide state-of-the-art human body tracking performance. However, they require body markers to be worn by the tracked human, as well as a dedicated calibration session.

The foregoing examples of the related art and limitations related therewith are intended to be illustrative and not exclusive. Other limitations of the related art will become apparent to those of skill in the art upon a reading of the specification and a study of the Figures.

SUMMARY

The following embodiments and aspects thereof are described and illustrated in conjunction with systems, tools and methods which are meant to be exemplary and illustrative, not limiting in scope There is provide, in some embodiments, a system comprising at least two three-dimensional (3D) cameras that are each configured to produce a digital image with a depth value for each pixel of the digital image; at least one hardware processor configured; and a non-transitory computer-readable storage medium having stored thereon program instructions, the program instructions executable by the at least one hardware processor to perform inter-camera calibration by: (i) estimating a pose of a subject, based, at least in part, on a skeleton representation of the subject captured by each of said at least two 3D cameras, wherein said skeleton representation identifies a plurality of skeletal joints of said subject, and (ii) enhancing the estimated pose based, at least in part, on a 3D point cloud of a scene containing the subject, as captured by each of said at least two 3D cameras, and perform data merging of digital images captured by said at least two 3D cameras, wherein the data merging is per each of said identifications.

There is also provided, in some embodiments, a method comprising performing inter-camera calibration with respect to at least two three-dimensional (3D) cameras that are each configured to produce a digital image with a depth value for each pixel of the digital image, by: (i) estimating a pose of a subject, based, at least in part, on a skeleton representation of the subject captured by each of said at least two 3D cameras, wherein said skeleton representation identifies a plurality of skeletal joints of said subject, and (ii) enhancing the estimated pose based, at least in part, on a 3D point cloud of a scene containing the subject, as captured by each of said at least two 3D cameras, and performing data merging of digital images captured by each of said at least two 3D cameras, wherein the data merging is per each of said identifications.

There is further provided, in some embodiments, a computer program product comprising a non-transitory computer-readable storage medium having program instructions embodied therewith, the program instructions executable by at least one hardware processor to: perform inter-camera calibration with respect to at least two three-dimensional (3D) cameras that are each configured to produce a digital image with a depth value for each pixel of the digital image, by: (i) estimating a pose of a subject, based, at least in part, on a skeleton representation of the subject captured by each of said at least two 3D cameras, wherein said skeleton representation identifies a plurality of skeletal joints of said subject, and (ii) enhancing the estimated pose based, at least in part, on a 3D point cloud of a scene containing the subject, as captured by each of said at least two 3D cameras, and perform data merging of digital images captured by said at least two 3D cameras, wherein the data merging is per each of said identifications.

In some embodiments, each of said at least two 3D cameras is a Microsoft Kinect sensor.

In some embodiments, each of said identifications has a confidence score.

In some embodiments, said data merging is a weighted data merging based, at least in part, on weights assigned to each of said joints, and wherein said weights are assigned based on at least some of said confidence score, a frontality measure, and a distance measure.

In some embodiments, said estimating comprises calculating an optimal 3D rigid transformation between each of said skeleton representations.

In some embodiments, said transformation is further optimized using random sample consensus (RANSAC).

In some embodiments, said enhancing comprises aligning said 3D point cloud using an iterative closest point (ICP) algorithm.

In some embodiments, said aligning is based, at least in part, on said calculated transformation.

In some embodiments, each of said 3D point clouds further comprises 3D points representing a ground plane near the legs of said subject.

In some embodiments, said at least two 3D cameras comprise between 3 and 6 said 3D cameras, arranged around said subject.

In some embodiments, said program instructions are further executable to perform, and in the case of the method, said method further comprise performing, said inter-camera calibration with respect to each pair of neighboring said 3D cameras.

In some embodiments, said estimating comprises concatenating all said inter-camera calibrations along a shortest path.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced Figures. Dimensions of components and features shown in the Figures are generally chosen for convenience and clarity of presentation and are not necessarily shown to scale. The Figures are listed below.

FIG. 4 shows two Kinects during real-time network streaming;

DETAILED DESCRIPTION

Disclosed herein is a human motion capture and tracking system and associated method and computer program product. These provide for marker-less, calibration-free motion capture and tracking.

The system is suitable for quick setup in the context of home use and/or tele-medicine applications, and may be also applied in a variety of additional applications, including security, object tracking, and more. A working system of the present invention has been constructed by the inventors using widely-available consumer-grade 3D camera, such as the Microsoft® Kinect® V2.0 (http://www.xbox.com/en-US/xbox-one/accessories/kinect). These cameras supply a video stream of 2. two-and-a-half-dimensional (2.5D) data in the form of three-dimensional (3D) point clouds, in addition to RGB data. Additionally, they supply a skeleton representation of the subject, computed per frame from the point cloud (see, e.g., J. Shotton, A. Fitzgibbon, M. Cook, T. Sharp, M. Finocchio, R. Moore, A. Kipman, and A. Blake; "Real-time human pose recognition in parts from single depth images"; Int. Conf. Computer Vision Patern recognition (CVPR), pages 1297-1304, 2011; J. Shotton, T. Sharp, A. Kipman, A. Fitzgibbon, M. Finocchio, A. Blake, M. Cook, and R. Moore; "Real-time human pose recognition in parts from single depth images"; Communications of the ACM, 56(1):116-124, 2013).

Microsoft Kinect V2.0 was released in 2013 using time-of-flight technology and incorporating human tracking and skeleton representation. Since its release, the Kinect Camera V2.0 has been extensively studied for its noise statistics (see, e.g., T. Mallick, P. P. Das, and A. K. Majumdar; "Characterizations of noise in Kinect depth images: A review"; IEEE Sensors Journal, 14(6):1731-1740, 2014 B; Choo, M. Landau, M. DeVore, and P. Beling; "Statistical analysis-based error models for the Microsoft Kinect depth sensor"; Sensors, 14(9):17430-17450, 2014; D. Falie et al.; "Noise characteristics of 3d time-of-flight cameras"; International Symposium on Signals, Circuits and Systems, ISSCS, volume 1, pages 1-4, 2007), tracking capabilities, and compared with state-of-the art and commercial human motion camera systems. The Kinect has been used in various applications, such as medical applications including Parkinson's disease Tracking, balance disorders, rehabilitation, elderly monitoring, sport and dance tracking and analysis, and various other computer vision applications.

Figure 2:
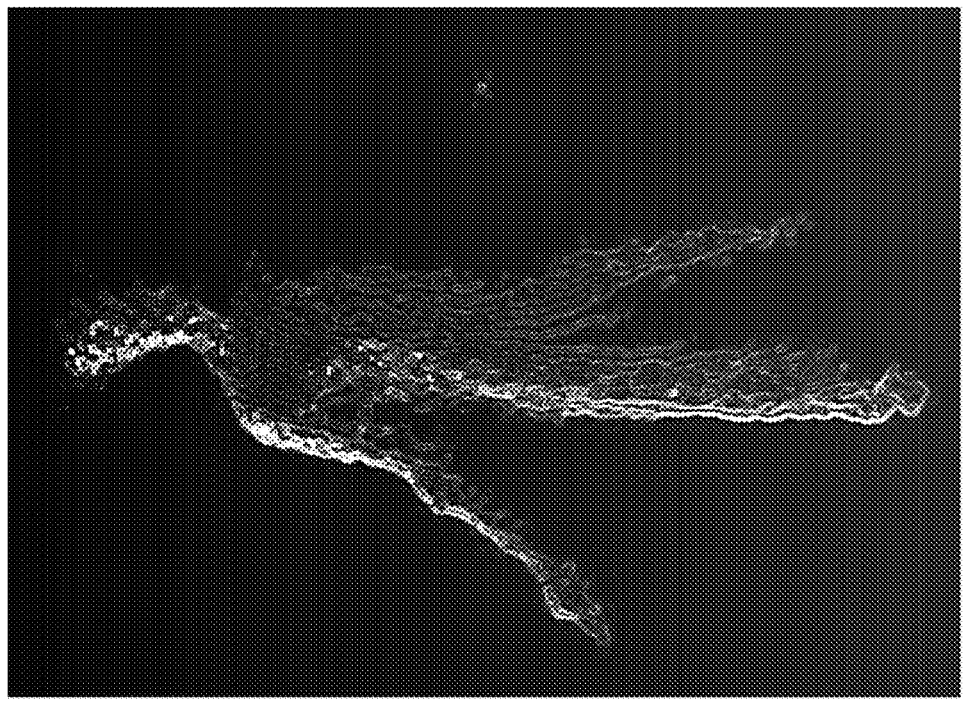
FIG. 2 shows Kinect acquisition failure examples.
Figure 2:
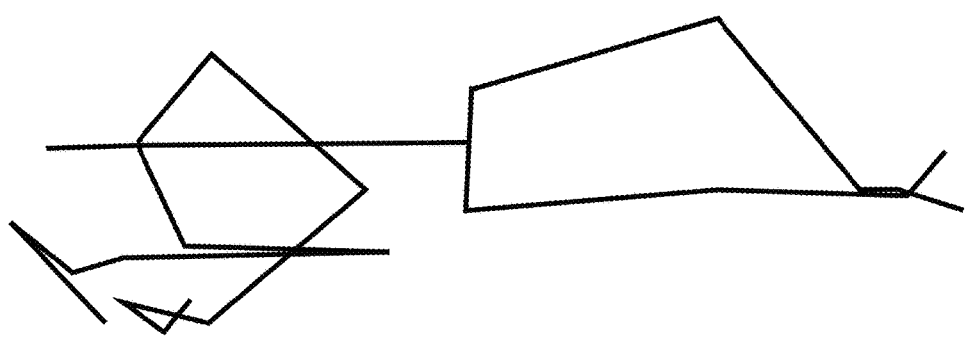

However, as relatively inexpensive consumer-grade products, these cameras may only offer limited accuracy and robustness of the captured data (see, e.g., B. Galna, G. Barry, D. Jackson, D. Mhiripiri, P. Olivier, and L. Rochester; "Accuracy of the Microsoft Kinect sensor for measuring movement in people with Parkinson's disease"; Gait & posture, 39(4):1062-1068, 2014). In addition, these cameras have several known issues inherent to the technology; for example, the subject typically has to be in a mostly frontal pose relative to the camera plane, in order to be accurately tracked by the sensor. Violations of this and other constraints may result in a partial or complete failure to accurately capture the skeleton, as well as in erroneous or incomplete cloud points, as shown in FIG. 2.

To overcome these issues, and to improve accuracy and robustness of the data, disclosed herein is an advantageous multiple camera setup. Although this disclosure refers to the usage of Microsoft® Kinect® V2.0 cameras, those of skill in the art will recognize that the present techniques are readily applicable to other types and models of 3D cameras.

In some embodiments, in the present multiple camera setup, the data acquired from different viewpoints may achieve more coverage of the captured scene and can also assist in error minimization. Furthermore, registration from several views can transform the data from a 2.5D representation into a full 3D representation (see FIG. 8).

In some embodiments, the present marker-less, multi-camera setup allows temporal synchronization among cameras to produce an accurate pose estimation that is calculated in real time and does not require a calibration stage or any special calibration equipment. The system performs runtime merging of data, resulting in a more reliable and stable skeleton representation, and in addition allows for the alignment and merging of the 3D point clouds, to form a full 3D body representation.

Figure 3:
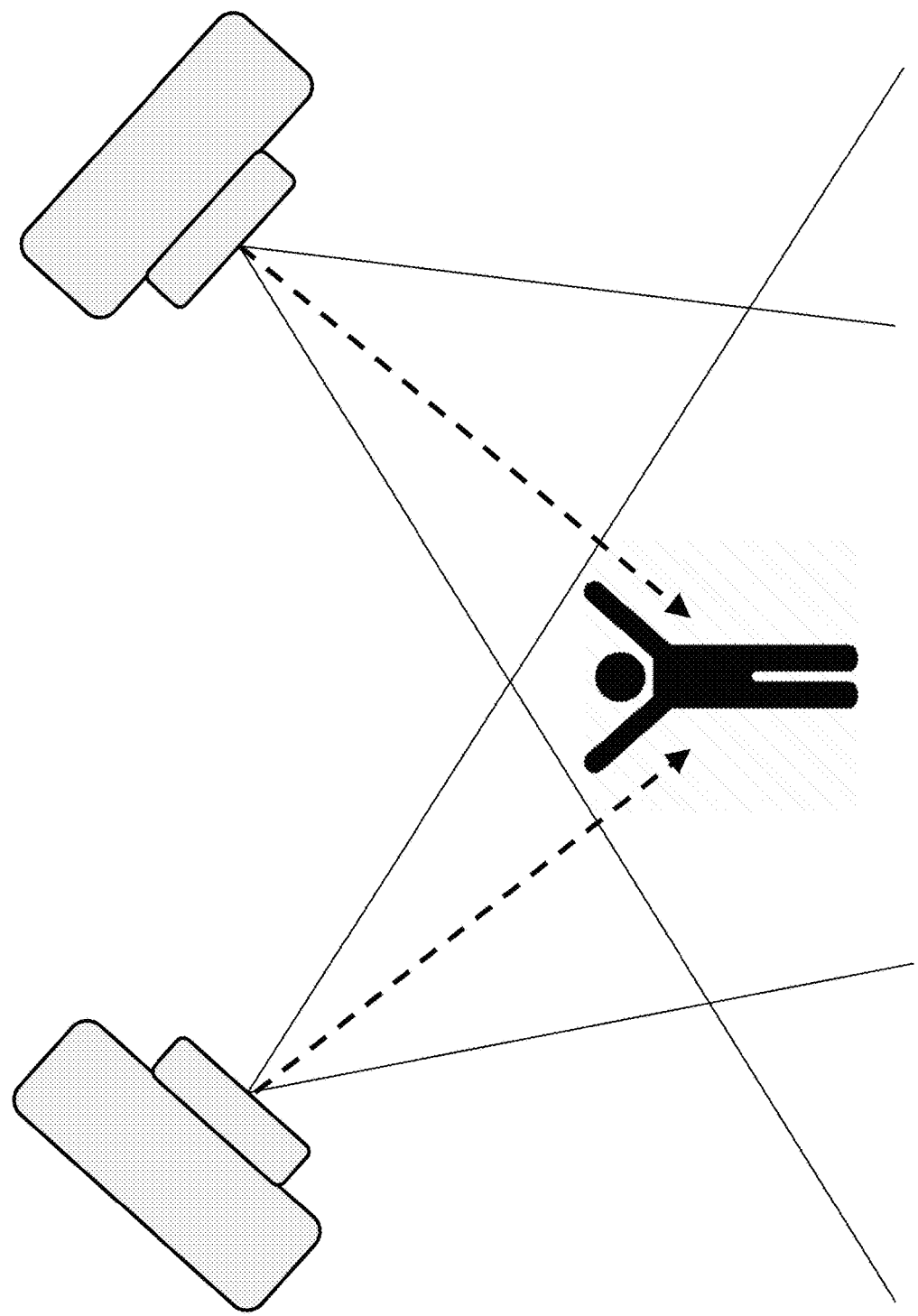
FIG. 3 shows a two-camera setup.

As a test case, the inventors have applied the system for computerizing the "Fugl-Meyer" stroke rehabilitation assessment protocol (see FIG. 10) (see A. R. Fugl-Meyer et al.; "The post-stroke hemiplegic patient: a method for evaluation of physical performance"; Scandinavian journal of rehabilitation medicine, 7(1):13-31, 1974). The test system uses two cameras (FIG. 3), ensuring each side of the patient's body is properly covered, and producing a reliable and error-free skeleton to be used in diagnosis. However, embodiments of the invention may utilize a greater number of cameras, such as 3, 4, 5, 6, or more cameras.

The present system maximizes the potential of multi-3D camera setup, and provides advantageous synchronization, calibration, and merging methods, as well as new insight and guidelines for multi-3D-camera setup and human motion tracking. For example, using both skeletal and 3D data for calibration, and using frontality and distance from camera to perform data merging.

In some embodiments, the present multi-camera tracking system outputs reliable skeleton and merged point clouds. As in any multi-camera system, several necessary challenges must be dealt with:

Temporal synchronization to ensure that frames from different cameras are temporally aligned prior to merging their data.

Camera calibration to calculate scene-to-camera coordinate transformation.

Pose estimation (inter-camera alignment) to ensure alignment of data from different cameras into a uniform coordinate space, prior to merging.

Data merging to efficiently and reliably merge data from the different cameras into a single coherent representation.

Figure 4:
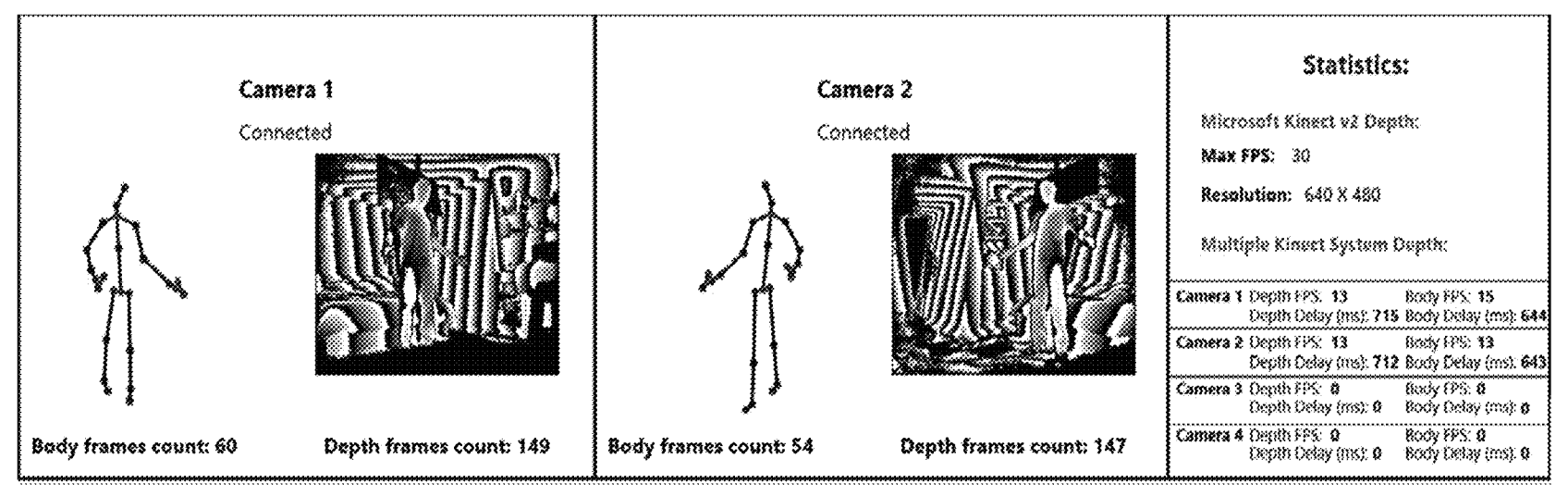

The first generation of Kinect (V1), using structured-light IR technology, creates challenges in a multiple-camera setup with scene overlap due to IR interference. In contrast, the Kinect V2.0, based on time-of-flight IR technology, allows using multiple depth sensors simultaneously with only minor interference. However, the Microsoft Kinect PC Driver does not support connection of multiple sensors into a single computer. Open source drivers, such as the "OpenKinect" (https://openkinect.org), allow connection of several sensors, however, at the cost of excluding the skeleton data. For the present system, a unique solution for handling several computers connected to multiple Kinects simultaneously was developed. The temporal synchronisation between recordings is optionally obtained using an NTP server. All data required for calibration and merging is transmitted to the server that runs the system algorithms. Since this requires only the skeleton data stream, which is of narrow bandwidth, the experimental system runs in realtime over a LAN communication network producing a single fused skeleton stream (FIG. 4).

Multiple camera setups basically require scene-to-camera calibration, as well as pose estimation between cameras, in order to merge their synchronized frames. Intra-camera calibration, i.e., the mapping of scene coordinates to camera coordinates, is inherently given in 3D cameras. However, the pose estimation or inter-camera calibration must still be calculated. There are quite a few accurate techniques for calibrating multiple cameras using accessories such as a board, a flashlight, and a marker.

However, running calibration sessions, and using special calibration equipment, may be a drawback in cases where simplicity of setup and operation are pat mount simple, especially for home or remote use. Accordingly, this disclosure provides for an advantageous method for calibration which can be performed on-the-fly and requires no special calibration session. Rather, it relies on the body of the subject being captured in the scene. The present invention exploits both the skeleton representation and the 3D point clouds captured by the cameras to achieve accurate calibration in very little time.

Figure 1:
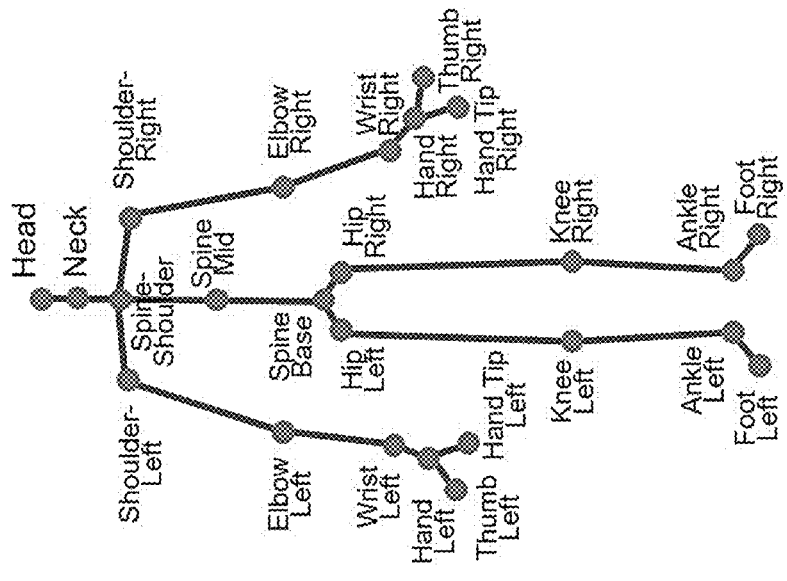
FIG. 1 shows a Microsoft Kinect skeleton (left) and a joint map (right)
Figure 1:
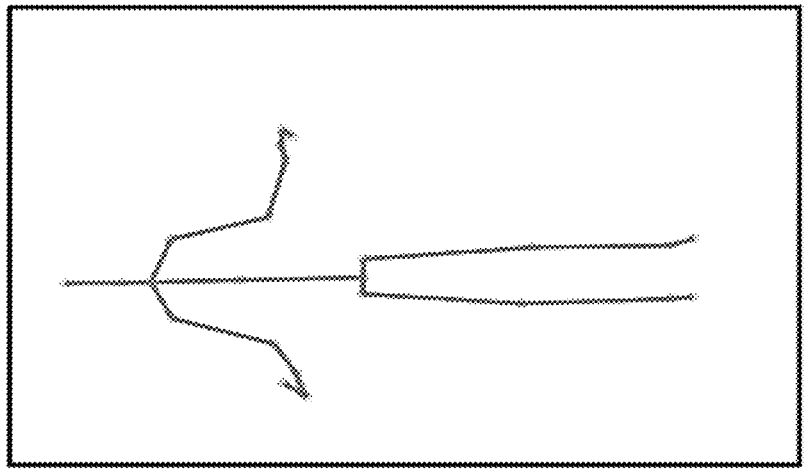

The skeletal data consists of only a few points (FIG. 1) and they are tagged so that paired matching between cameras is given. However, the positions of the skeleton points are unreliable, noisy and at times completely missing. The skeleton points are streamed per frame per camera, and each point is associated with a name, 3D coordinates, and a 'confidence of tracking' value which indicates the joints accuracy. The joint confidence is graded as: 'well-tracked,' 'inferred,' and 'not-tracked.' The Skeleton is estimated per video frame based on the depth map acquired by the camera. There are frequent estimation errors and mistakes caused both from the depth measurement error and due to occluded body parts from the cameras line of sight. Furthermore, since Kinect camera are 'trained' selectively for frontal views, side or back poses do not work as well (see FIG. 2).

In contrast, the 3D cloud of points are of higher positional precision, however, there are over 300,000 data points and they are not matched among multiple cameras. Additionally, perfect alignment among cameras is not always guaranteed.

In some embodiments, one of the goals of the present invention is to minimize these errors by combining body skeletons from multiple views and producing an improved body-skeleton stream. In the context of calibration, errors and noise in the skeleton joints must be taken into consideration during the process.

Accordingly, in some embodiments, the present calibration approach exploits the relative advantages of each type of data set is exploited to provide for the following two-step calibration process:

(i) Determining the pose (rigid transformation) among cameras, based on the skeleton data.

(ii) Using an estimated pose from the skeleton as initializer for pose estimation from the 3D point clouds, to obtain a more precise transformation.

In some embodiments, the multi-camera system consists of a number of cameras that must first be calibrated. In the following, the calibration between a pair of cameras is described. The extension to a large number of cameras is discussed later.

Figure 7:
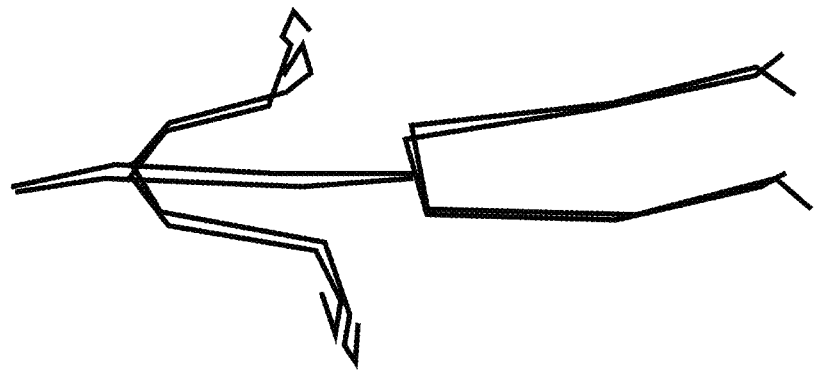
FIG. 7 shows a skeleton alignment example.
Figure 7:
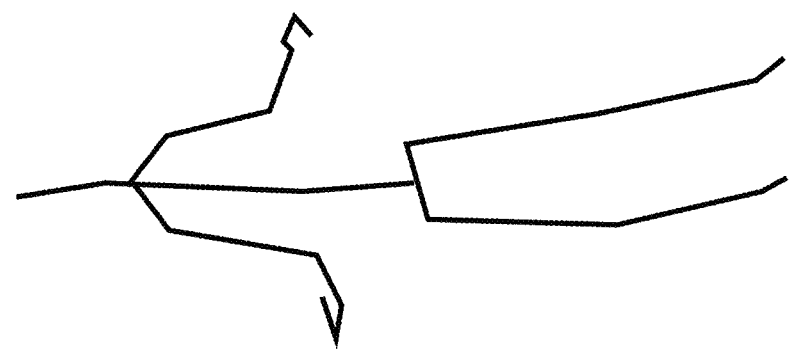
Figure 7:
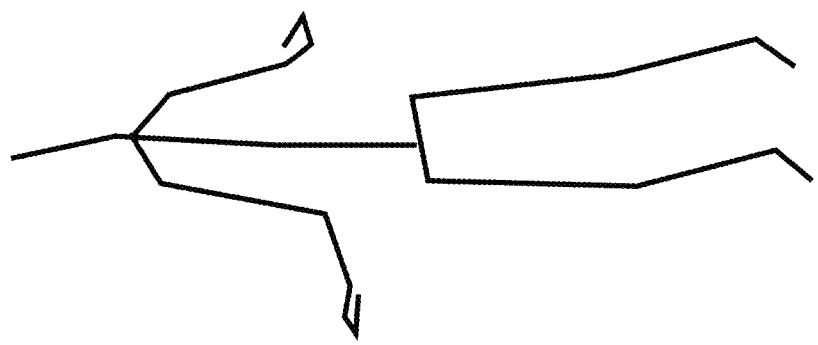

In some embodiments, the transformation between cameras is initially calculated by aligning the body skeletons as shown, for example, in FIG. 7. This can be described as finding the optimal 3D rigid transformation (rotation and translation) between two sets of corresponding 3D point data.

In some embodiments, the Kabsch algorithm (see W. Kabsch; "A discussion of the solution for the best rotation to relate two sets of vectors"; Acta Crystallographica, A34: 827-828, 1976; W. Kabsch; "A solution for the best rotation to relate two sets of vectors"; Acta Crystallographica, A32: 922-923, 1976) is used to determine the optimal rotation between cameras, based on the skeleton points. Given two sets of points, they are first translated so that their centroids are at the origin (Equation 1 below), and then Singular Value Decomposition (SVD) is applied to the Cross-Covariance Matrix of the points, to determine the rotation matrix R (Equations 2-3 below). The translation vector t is calculated by applying the rotation and subtracting the centroid (Equation 4 below):

$$H = \Sigma_{j=1}^{N}(p_A^i - \text{centroid}_A)(p_B^i - \text{centroid}_B)^T \quad (1)$$

$$[USV] = \text{SVD}(H) \quad (2)$$

$$R = VU^T \quad (3)$$

$$t = -R \times \text{centroid}_A + \text{centroid}_B \quad (4)$$

Although only a small number of joints are computed per skeleton, the calibration is performed over a large number of frames streamed by each camera, since the camera pose does not change from frame to frame. Thus, random sample consensus (RANSAC; see M. A. Fischler and R. C. Bolles; "Random sample consensus: a paradigm for model fitting with applications to image analysis and automated cartography"; Communications of the ACM, 24(6):381-395, 1981) may be used to optimize the 3D rigid transformation. Smart selection of skeleton joints is performed based on joint confidence measures, as well as joint type (body part). At each iteration, three joint pairs from corresponding frames of the two cameras are randomly chosen, such that every joint is from a different body region: upper, mid and lower body sections. This improves robustness and viability of the computed 3D transformation. The 3D transformation with the largest number of supporting joints across all frames is returned as output.

Figure 5:
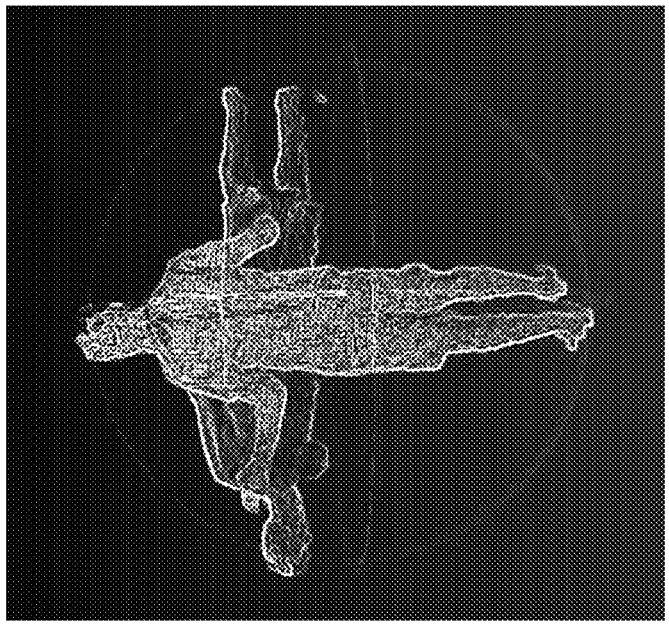
FIG. 5 shows that aligning cloud points using ICP without good initial guess produces incorrect alignments.
Figure 5:
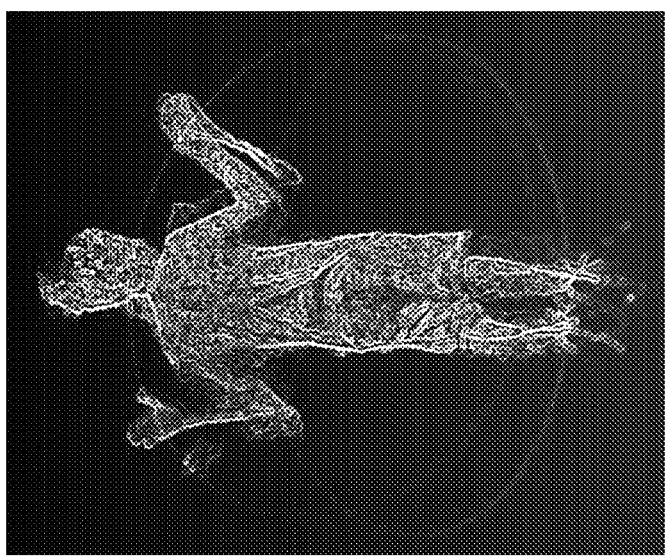

The pose calculated from the skeleton data provides a good estimate for the inter-camera calibration. However, due to the noise and errors in the skeleton, the resulting 3D transformation can still be improved. Thus, in some embodiments, the present invention next exploits the more reliable 3D point clouds supplied by the cameras. The inter-camera transformation is further refined by aligning the 3D points using the ICP algorithm (see P. J. Besl, N. D. McKay, et al.; "A method for registration of 3-d shapes"; IEEE Transactions on pattern analysis and machine intelligence, 14(2): 239-256, 1992). This, however, requires a good 'initial guess,' otherwise, ICP may converge to an incorrect local minimum. See, e.g., FIG. 5, which shows how aligning cloud points using ICP without good initial guess may produce incorrect alignments, as compared with, e.g., successful alignment in FIG. 8.

Thus, in some embodiments, the transformations calculated from the skeleton alignment may be used as the initial guess for alignment of the 3D points using ICP. In some embodiments, a further improvement may be introduced by including, in addition to the 3D body points, the 3D points of the ground plane (i.e., the 'floor') near the subject's legs. This addition of points may be introduced so as to increase scene overlap of the 3D points between two cameras. In some embodiments, the resulting 3D transformation shows an improvement of 37% in accuracy over the initial estimate obtained using the skeleton data.

Figure 6:
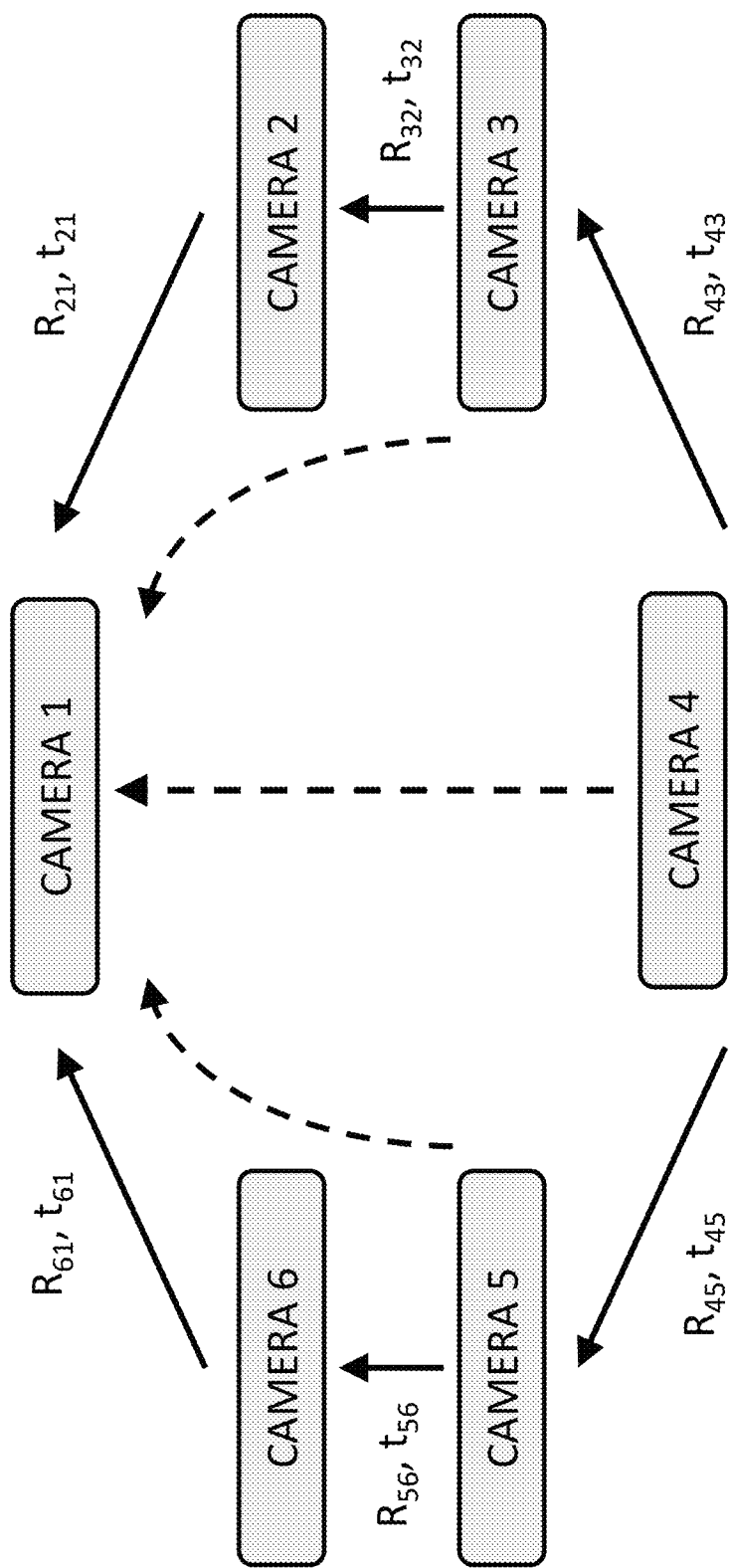
FIG. 6 shows a calibration of a 6-camera system, performed pairwise between neighboring cameras and propagated to same coordinate system along shortest path.

The calibration and pose estimation algorithm described above considered the case of only two cameras. In some embodiments, the present system runs on multiple cameras, with typical scenarios ranging between 2-6 cameras. Extending the calibration to more than two cameras is based on evaluating several pairwise inter-camera calibrations as described above. A critical insight is that due to Kinect inaccuracy for non-frontal views (resulting in low confidence or erroneous skeleton joints), it is of significant importance to perform pairwise calibration between cameras whose skeleton joints are reliable in corresponding frames. This criterion will arise significantly more often when the two cameras have as similar a viewpoint as possible. This will be shown empirically below. Thus, the calibration protocol calibrates pairs of neighboring cameras, resulting in pairwise 3D rigid transformations. FIG. 6 illustrates the calibration process for a 6-camera system. As can be seen, calibration is performed pairwise between neighboring cameras, and then propagated to the same coordinate system along shortest path. The final transformation from camera to a single coordinate system (e.g., that of Camera 1) is obtained by concatenating the transformations along the shortest path.

In some embodiments, following the calibration and pose estimation stages, all the acquired data from all cameras are aligned in a common coordinate frame. The following section describes methods for merging the data, specifically the skeleton and later the 3D cloud of points. In some embodiments, the following merging criteria may be proposed, with each targeting a weakness of the camera system:
(i) The Kinect camera supplies a skeleton per frame with a confidence ranking per joint. Thus joints with low confidence are either disregarded or weighted very low in the merging process.
(ii) IR sensors are inherently noisy. Additional distortions are introduced due to scene interference, lighting, scene inter-reflections etc. This noise directly affects the quality of the point clouds and indirectly the skeletons. Reduction in noise can be introduced by 'averaging' data from multiple views.
(iii) Kinect's skeleton computation algorithm does not perform well on non-frontal views. This is due to self occlusion and the fact that the algorithm was trained mainly on frontal views. This problem suggests a weighting scheme that awards skeleton joints associated with frontal views. Frontality can be deduced by evaluating the confidence of the 2 shoulder joints and their depth values.
(iv) Kinect's skeleton computation algorithm does not distinguish front vs. back of subject. Thus, when the subject is back facing the camera, it will yield a skeleton in a frontal pose. However, even if the skeleton is reflected, its pose still remains very inaccurate. Accordingly, in some embodiments, a criterion that recognizes back-facing skeletons may be used to assign to them the minimal confidence level.
(v) Given the 2.5D nature of the depth data, distant objects have fewer sampled depth points per area, and as such are less reliable. Preference is thus given to joints acquired by the camera closest to the joint.

In some embodiments, data merging is performed per skeleton joint, per frame. When considering a set of joint measurements P from different cameras in a given time frame, only the measurements with the highest confidence ranking from the set are retained. For each such joint measurement $p \in P$, we measure its frontality angle $\alpha_p$ and its distance from the camera $dist_p$. To obtained the single merged joint $p_m$, several possible merging techniques are considered:

Average:

$$p_m = \frac{\Sigma_{p \in P}\, p}{|P|} \quad (5)$$

Frontality:

$$p_m = \underset{p \in P}{\operatorname{argmin}} \alpha_p \quad (6)$$

Distance:

$$p_m = \underset{p \in P}{\operatorname{argmin}} dist_p \quad (7)$$

Weighted Average:

$$p_m = \frac{\Sigma_{p \in P}\, w_p p}{\Sigma_{p \in P}\, w_p} \quad (8)$$

The weights $w_p$ could be equal to the frontality weights $w_f$, the distance weights $w_d$, or their product $w_f w_d$. The weights are defined as:

$$w_f = \exp^{-\alpha_p^2 / \gamma_a},$$
$$w_d = \exp^{-(dist_p - d_0)^2 / \gamma_d}.$$

The constants were determined empirically (see below) and were set to, $\gamma_a=1.1$, $\gamma_d=2.0$, and $d_0=0.5m$ (the Kinect minimal sensing distance).

Example of merged skeletons are shown in FIG. 7. Further below we experiment and analyze these different merging methods.

Figure 8:
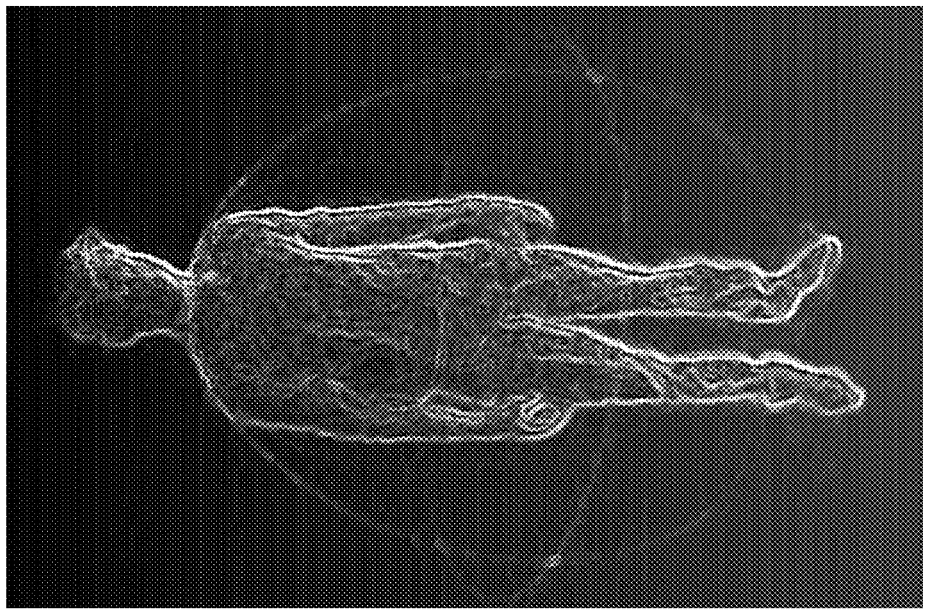
FIG. 8 shows aligned and merged cloud points from two cameras.
Figure 8:
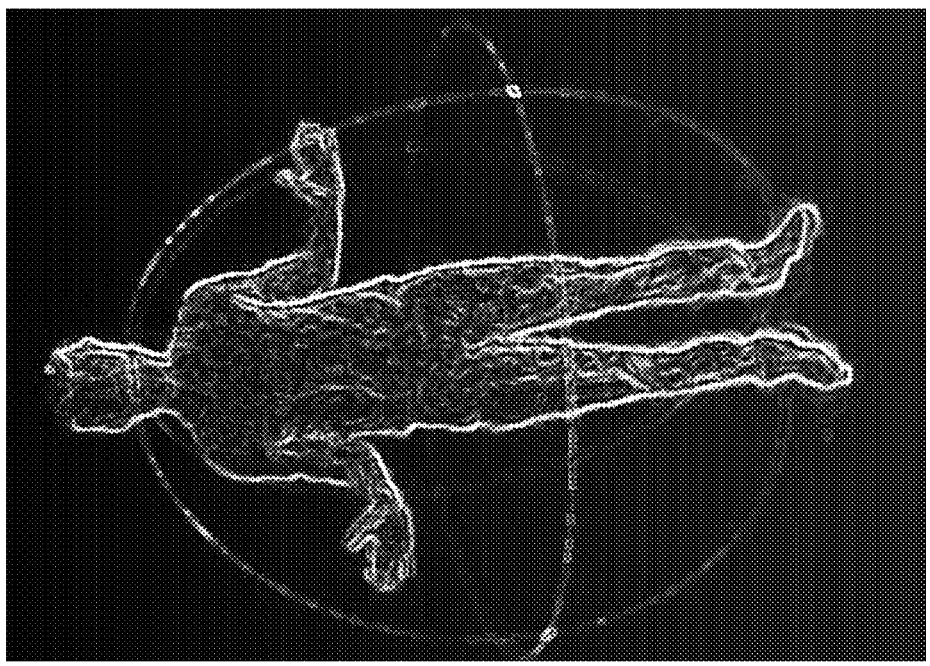

An additional outcome of the present system is that given the calibration parameters, the 3D cloud points from the different cameras can be aligned and merged. A circular camera setup can transform the partial 3D point clouds into a full body mesh. Thus, the multiple 2.5D data streams may be transformed into a single and complete 3D representation (FIG. 8).

Experimental Results

In this section, the results of several tests performed to evaluate the system are reported, including evaluating the effects of number and positioning of multiple cameras, evaluating the calibration and pose estimations, and comparison of the merging methods.

In order to test the system and evaluate its algorithms, several sessions were recorded in a circular setup of 6-cameras (similar to the setup shown in FIG. 6). Per session, these cameras recorded several thousand frames simultaneously, of a single person performing articulated motions in the scene. As mentioned above, calibration of the multi-camera system is performed between pairs of neighboring cameras, because larger scene overlap significantly increases accuracy. The final inter-camera calibration maps each camera to a single coordinate system by concatenating transformations along the shortest path in the camera circle. To evaluate the calibration, a random camera was selected and its 3D points were transformed to the farthest camera along the circle in a clockwise path and then in the anticlockwise path (for example, with reference to FIG. 6, camera 4 data is mapped to camera 1 by concatenating transformations 4 to 3, 3 to 2 and 2 to 1, and then concatenating transformations 4 to 5, 5 to 6, and 6 to 1). A perfectly calibrated system would show alignment of these two mapped sets. RMSE of the difference between the two mapped sets was found in the tests to be 0.0311 meters following the skeleton pose estimation, and 0.0196 meters when 3D point cloud alignment was included, an improvement of 37% in accuracy. However, this accuracy was measured over a 4-camera propagation path in which error accumulates. Thus, it is expected that the accuracy is even further improved between cameras requiring less propagation steps.

In the next test, the quality of results was evaluated as a function of the number of cameras and their positions. Two factors affect the quality of the merged skeleton output: the quality of the joint measurements from all cameras, and the merging algorithm used to combine the joint data into a single reliable joint. In this section, the quality of the measurements as a function of the camera setup is evaluated.

As described above, for every joint, for every time-frame, a collection P of joint measurements are obtained from a group of cameras. The final merged skeleton joint $p_m$ is calculated from these measurements. The reliability of $p_m$ is tagged based on the quality and confidence of its measurements $p \in P$. Specifically, each measured joint p is tagged for confidence by the Kinect camera as high ('well-tracked'), mid ('inferred') and low ('not-tracked'). Furthermore, joint measurements originating from a back-facing subjects are detected automatically and are tagged as low confidence in the system. A merged joint $p_m$ is then tagged as having high confidence if at least one of the joint measurements is of high confidence. A merged joint is tagged as back pose if all joint measurements are back posed.

For testing, the circular setup of cameras numbered 1-6 as shown in FIG. 6 was considered. A camera configuration is a specific subset of these cameras. A configuration depends on the number of cameras as well as their positions within the camera circle. Table 1 shows statistics on the number of high confidence merged joints and the number of back posed joints resulting data merging using a specific camera configuration.

TABLE 1

Evaluating camera configuration

| Camera Configuration | Configuration Type | Back Pose Joints | Back Pose Joints % | High Confidence Joints | High Confidence Joints % |
|---|---|---|---|---|---|
| [1] | Single Camera | 37300 | 51.20 | 33796 | 46.39 |
| [1, 2] | Neighboring | 2190 | 30.06 | 49518 | 67.94 |
| [1, 3] | Circular | 21125 | 29.00 | 49973 | 68.60 |
| [1, 2, 3] | Neighboring | 20950 | 28.76 | 50474 | 69.28 |
| [1, 3, 5] | Circular | 6325 | 8.68 | 66102 | 90.47 |
| [1, 2, 3, 4] | Neighboring | 3775 | 5.18 | 68196 | 93.61 |
| [1, 2, 3, 4, 5] | Neighboring | 2150 | 2.95 | 70641 | 96.97 |
| [1, 2, 3, 4, 5, 6] | All Cameras | 0 | 0 | 72815 | 99.95 |

Several conclusions may be deduced from the results. First, it is clear that quality of measurements improves with the number of cameras in the setup. Both an increase in number of high confident joints as well as a decrease in low confidence back posed joints can be seen. This is due to the fact that more cameras increase the chances of a frontal view, a closer joint and more reliable joint, implying a higher quality of measurement. The second conclusion involves camera positions within the setup. Here, two types of configurations may be distinguished: 'neighboring' configurations, where all cameras are arranged equidistantly along a circle, and 'circular' configurations, where cameras are spread out along the camera circle. It can be seen that for the same number of cameras, the circular configuration is preferable, providing higher quality measurements. This can be explained in that neighboring configurations do not cover all viewpoints of the subject, resulting in many frames in which all cameras do not see frontal view of subjects. In contrast, a circular configuration increases the chances of at least one of the cameras capturing a reliable frontal view for any pose of the subject.

In the next test, the quality of the merged skeleton was evaluated based on the merging algorithm used to combine the measured joints into a single reliable joint.

Two measures for evaluating a skeleton's accuracy and robustness were used. The first evaluates the consistency of the skeleton's bone length across all time frames. For each bone (segment connecting two neighbouring joints) the standard deviation of the bone length over all confident joints across all video frames is calculated. This measure is considered with respect to the 3 dominant and most reliable bones: shoulder to spine, shoulder to elbow and elbow to wrist.

The second measure for skeleton evaluation evaluates the accuracy of the skeleton with respect to new camera measurements. Considering again the configuration of 6 cameras (FIG. 6), for each configuration (subset of cameras), calibration is applied and the skeletons are merged. Given the merged skeleton, the set of remaining cameras is used for evaluation. For each reliable measured joint from these new cameras, the distance to their corresponding joint in the merged skeleton is computed, and the number of these distances that are smaller than a given threshold d is counted.

The testing used these two measures on different merging methods for different camera configurations. The merging methods as discussed above (Equations 5-8) include: simple averaging, distance based, frontality based and weighted averaging (frontality weighted, distance weighted and weighted by both).

Table 2 shows the resulting measures for different camera configurations and different merging methods. Several conclusions may be deduced from these results. First, frontality seems to take the main role for achieving robust and accurate merged skeletons, in all of its merging variations, whether choosing the "most frontal" camera in each frame or averaging with frontality weight.

Figure 9:
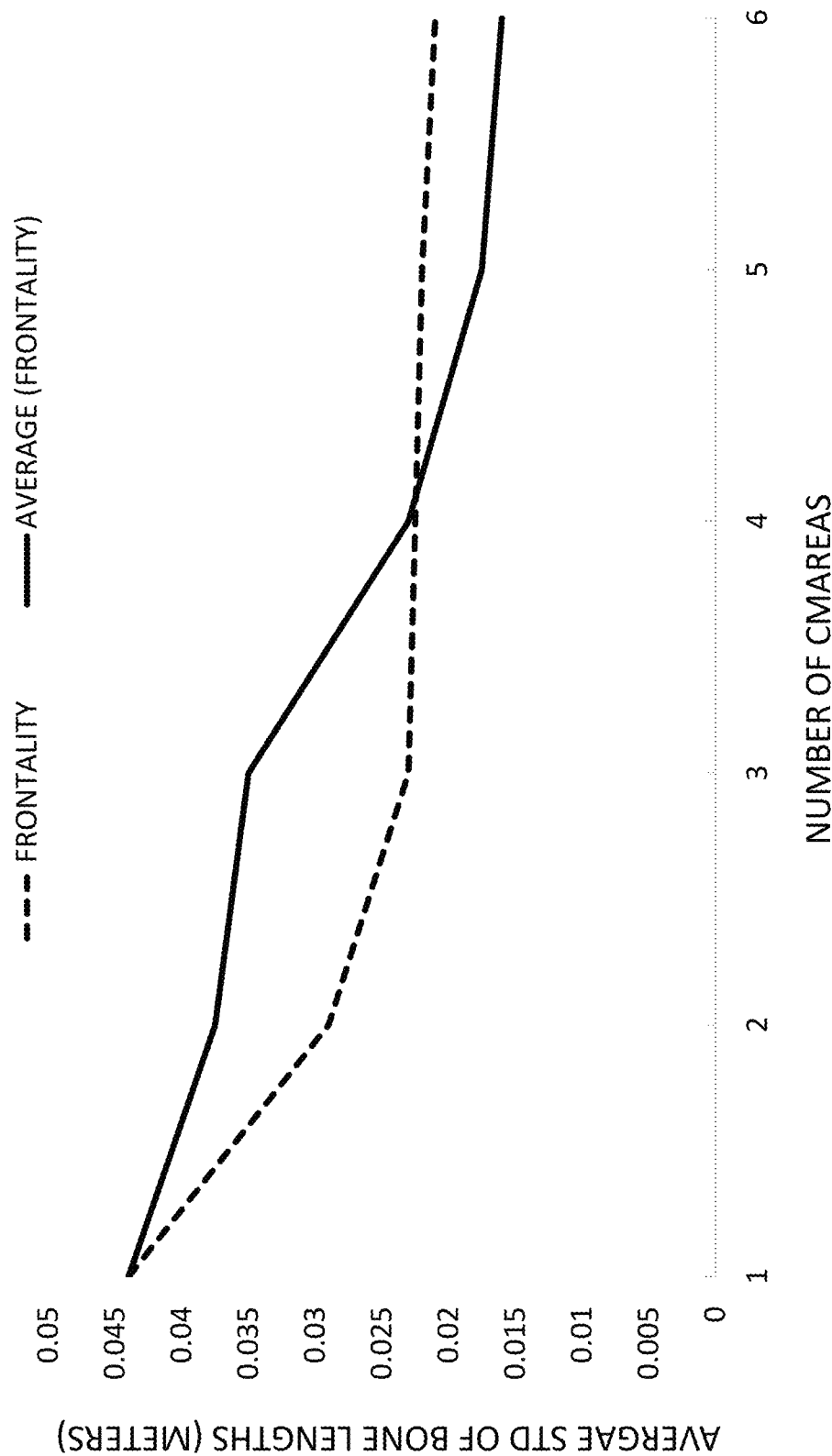
FIG. 9 shows a graph of a skeleton alignment example.

Another conclusion from the results is that the method of merging using frontality changes with the number of cameras and with the amount of scene overlap that these cameras share. Frontality based merging is advantageous with a small number of cameras (rows encircled by a thick line) and averaging using frontality weights is better for a large number of cameras (the last two rows). FIG. 9 further emphasises this conclusion by plotting the frontality measure against number of cameras and shows the tradeoff point to be at 4 cameras. This effect can be explained by considering that configurations with large scene overlap tend to produce more than one good (frontal) joint measurements per frame, and thus these should be averaged. However for small scene overlaps is small ([1,3,5]) for most frames, wherein only one camera may capture a frontal pose and thus frontality based merging in which the single best measured joint is selected, outperforms averaging.

TABLE 2

Evaluating skeleton merging

| Camera Config. | Merging Method | Spine-to-Shoulder Std (m) | Shoulder-to-Elbow Std (m) | Elbow-to-Wrist Std (m) | Supporting Joints % (d = 0.05 m) | Supporting Joints % (d = 0.07 m) |
|---|---|---|---|---|---|---|
| [1, 2, 3] | Avergae | 0.0374 | 0.0363 | 0.0445 | 42.24 | 55.77 |
| [1, 2, 3] | Distance | 0.0282 | 0.0332 | 0.0341 | 42.11 | 55.10 |
| [1, 2, 3]* | Frontality | 0.0229 | 0.0265 | 00454 | 46.06 | 60.23 |
| [1, 2, 3] | Avg (Distance) | 0.0363 | 0.0325 | 0.0410 | 42.24 | 55.85 |
| [1, 2, 3] | Avg (Frontal) | 0.0373 | 0.0364 | 0.0443 | 42.36 | 55.87 |
| [1, 2, 3] | Avg (Dist + Frontal) | 0.0363 | 0.0325 | 0.0409 | 42.37 | 55.95 |
| [1, 3, 5] | Avergae | 0.0334 | 0.0255 | 0.0405 | 62.23 | 76.13 |
| [1, 3, 5] | Distance | 0.0218 | 0.0349 | 0.0536 | 60.95 | 75.71 |
| [1, 3, 5]* | Frontality | 0.0207 | 0.0203 | 0.0270 | 63.70 | 78.19 |
| [1, 3, 5] | Avg (Distance) | 0.0345 | 0.0261 | 0.0407 | 62.23 | 76.15 |
| [1, 3, 5] | Avg (Frontal) | 0.0322 | 0.0227 | 0.0375 | 63.39 | 77.38 |
| [1, 3, 5] | Avg (Dist + Frontal) | 0.0333 | 0.0233 | 0.0352 | 63.41 | 77.6 |
| [1, 2, 3, 4, 5, 6] | Avergae | 0.0150 | 0.0215 | 0.0288 | | |
| [1, 2, 3, 4, 5, 6] | Distance | 0.0167 | 0.0372 | 0.0523 | | |
| [1, 2, 3, 4, 5, 6] | Frontality | 00119 | 0.0174 | 0.0282 | | |
| [1, 2, 3, 4, 5, 6] | Avg (Distance) | 0.0148 | 0.0375 | 0.0338 | | |
| [1, 2, 3, 4, 5, 6] | Avg (Frontal) | 0.0089 | 0.0155 | 0.0245 | | |
| [1, 2, 3, 4, 5, 6] | Avg (Dist + Frontal) | 0.0088 | 0.0154 | 0.0282 | | |

Finally, comparing the two 3-camera configurations [1,2, 3] and [1,3,5] (rows marked with an asterisks), there can be sees support for the conclusion in the previous test, that the circular configurations are more advantageous for skeleton accuracy than neighboring configurations. The circular configuration [1,3,5] improves over the neighboring configuration [1,2,3] under both measures.

The Fugl-Meyer Assessment (FMA) is a stroke-specific, performance-based impairment index. It is designed to assess motor functioning, balance, sensation and joint functioning in patients with post-stroke hemiplegia. It is applied clinically and in research to determine disease severity, describe motor recovery, and to plan and assess treatment. It is performed manually and assessed visually by a medical professional.

According to some embodiments, the present system is used for tracking and evaluating this procedure using a cost-effective home based system. In order to be consistent with a physician's view of the examinee and also to prevention tracking failures, at least 2-sensors are necessary for analyzing both sides of the patient independently. Thus the present multi-camera system is appropriate for this task.

Figure 10:
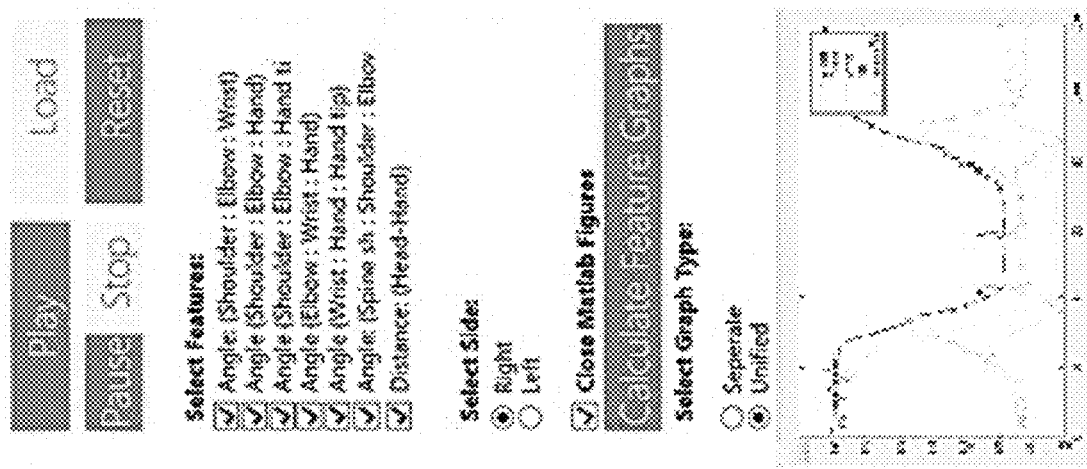
FIG. 10 shows analysis of the Fugl-Meyer hand salute test.
Figure 10:
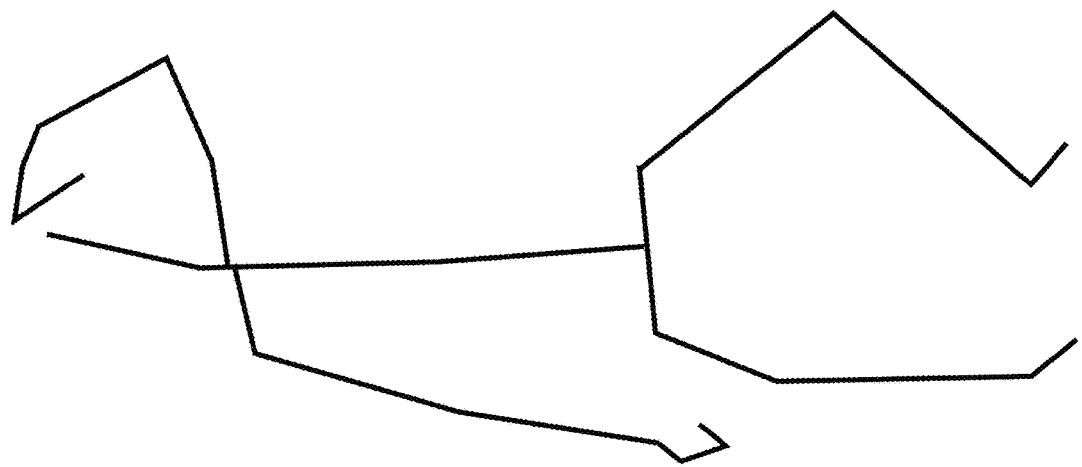

As a test case for the present system, a 2-camera system was used to film 30 sessions of "Fugl-Meyer" assessment at a public hospital. The participants were 20 stroke patients and 10 healthy subjects. An analysis application was developed for extracting measurements from the tracked body skeleton recordings and used in future to detect correlations against the physicians diagnosis as shown in FIG. 10.

To evaluate the present system, the tracked data from a single camera and from the present 2-camera system were analyzed and compared. The resulting tracking performance is given in Table 3. It can be seen that the 2-camera system is advantageous over either single camera.

TABLE 3

Multi camera system results - stroke assessment

| Camera Configuraiotn | Low-Confidence Joints | High-Confidence Joints | Bones Std (m) |
|---|---|---|---|
| [1] | 6812 | 124813 | 0.01745 |
| [1, 2] | 15839 | 115786 | 0.0206 |
| [1, 2] | 2006 | 129619 | 0.0163 |

Is sum, disclosed here is a multi-camera human tracking system. The system is inexpensive, portable and markerless. System calibration is adaptive and performed on the fly based on the human body being tracked, and so requires no calibration session nor special calibration equipment. Thus the system is well suited for home use and for tele-medicine applications.

The system performs runtime merging of the skeleton data, resulting in a more reliable and stable skeleton representation. 3D point cloud alignment and merging can be performed as well to form a full 3D body representation.

In the experimental results, excellent performance of the calibration algorithm (less than 0.02 m) and of the skeleton merging (less than 0.017 m std in our measure of bone length) were shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    at least three three-dimensional (3D) cameras that are each configured to produce a digital image with a depth value for each pixel of the digital image;
    at least one hardware processor; and
    a non-transitory computer-readable storage medium having stored thereon program instructions, the program instructions executable by the at least one hardware processor to:
    perform inter-camera calibration with respect to each pair of neighboring 3D cameras by:
    (i) estimating a pose of a subject, based, at least in part, on a skeleton representation of the subject captured by each of said at least two three 3D cameras, wherein said skeleton representation identifies a plurality of skeletal joints of said subject, and wherein each of said identifications has a confidence score and based, at least in part, on concatenating all said inter-camera calibrations along a shortest path, and
    (ii) enhancing the estimated pose based, at least in part, on a 3D point cloud of a scene containing the subject, as captured by each of said at least three 3D cameras, wherein said skeleton representation identifies a plurality of skeletal joints of said subject, and
    perform data merging of digital images captured by said at least three 3D cameras, wherein the data merging is per each of said identification.

2. The system of claim 1, wherein said data merging is a weighted data merging based, at least in part, on weights assigned to each of said joints, and wherein said weights are assigned based on at least some of: said confidence score, a frontality measure, and a distance measure.

3. The system of claim 1, wherein said estimating comprises calculating an optimal 3D rigid transformation between each of said skeleton representations, and wherein said transformation is further optimized using random sample consensus (RANSAC).

4. The system of claim 1, wherein said enhancing comprises aligning said 3D point cloud using an iterative closest point (ICP) algorithm.

5. The system of claim 1, wherein each of said 3D point clouds further comprises 3D points representing a ground plane near the legs of said subject.

6. A method comprising:
    performing inter-camera calibration with respect to each neighboring pair of at least three three-dimensional (3D) cameras that are each configured to produce a digital image with a depth value for each pixel of the digital image, by:
    (i) estimating a pose of a subject, based, at least in part, on a skeleton representation of the subject captured by each of said at least three 3D cameras, wherein said skeleton representation identifies a plurality of skeletal joints of said subject, and based, at least in part, on concatenating all said inter-camera calibrations along a shortest path and
    (ii) enhancing the estimated pose based, at least in part, on a 3D point cloud of a scene containing the subject, as captured by each of said at least three 3D cameras, and
    performing data merging of digital images captured by each of said at least three 3D cameras, wherein the data merging is per each of said identifications.

7. The method of claim 6, wherein said data merging is a weighted data merging based, at least in part, on weights assigned to each of said joints, and wherein said weights are assigned based on at least some of: said confidence score, a frontality measure, and a distance measure.

8. The method of claim 6, wherein said estimating comprises calculating an optimal 3D rigid transformation between each of said skeleton representations, and wherein said transformation is further optimized using random sample consensus (RANSAC).

9. The method of claim 6, wherein said enhancing comprises aligning said 3D point cloud using an iterative closest point (ICP) algorithm.

10. The method of claim 6, wherein each of said 3D point clouds further comprises 3D points representing a ground plane near the legs of said subject.

11. A computer program product comprising a non-transitory computer-readable storage medium having program instructions embodied therewith, the program instructions executable by at least one hardware processor to:

perform inter-camera calibration with respect to each neighboring pair of at least three three-dimensional (3D) cameras that are each configured to produce a digital image with a depth value for each pixel of the digital image, by:

(i) estimating a pose of a subject, based, at least in part, on a skeleton representation of the subject captured by each of said at least three 3D cameras, wherein said skeleton representation identifies a plurality of skeletal joints of said subject, and based, at least in part, by concatenating all said inter-camera calibrations along a shortest path, and (ii) enhancing the estimated pose based, at least in part, on a 3D point cloud of a scene containing the subject, as captured by each of said at least three 3D cameras, and perform data merging of digital images captured by said at least three 3D cameras, wherein the data merging is per each of said identifications.

12. The computer program product of claim 11, wherein said data merging is a weighted data merging based, at least in part, on weights assigned to each of said joints, and wherein said weights are assigned based on at least some of: said confidence score, a frontality measure, and a distance measure.

13. The computer program product of claim 11, wherein said estimating comprises calculating an optimal 3D rigid transformation between each of said skeleton representations, and wherein said transformation is further optimized using random sample consensus (RANSAC).

14. The computer program product of claim 11, wherein said enhancing comprises aligning said 3D point cloud using an iterative closest point (ICP) algorithm.

15. The computer program product of claim 11, wherein each of said 3D point clouds further comprises 3D points representing a ground plane near the legs of said subject.

\* \* \* \* \*